United States Patent [19]
Bollman et al.

[11] Patent Number: 5,978,519
[45] Date of Patent: *Nov. 2, 1999

[54] AUTOMATIC IMAGE CROPPING

[75] Inventors: James E. Bollman, Williamson, N.Y.; Ramana L. Rao, Los Alamos, N.Mex.; Dennis L. Venable, Marion; Reiner Eschbach, Webster, both of N.Y.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/692,559

[22] Filed: Aug. 6, 1996

[51] Int. Cl.⁶ ..................................................... G06K 9/20
[52] U.S. Cl. ........................................... 382/282; 382/270
[58] Field of Search .................................... 382/282, 283, 382/171, 172, 270, 272; 358/538

[56] References Cited

U.S. PATENT DOCUMENTS

| | | | |
|---|---|---|---|
| 4,809,064 | 2/1989 | Amos et al. | 358/76 |
| 5,115,271 | 5/1992 | Hagopian | 355/74 |
| 5,363,209 | 11/1994 | Eschbach et al. | 358/445 |
| 5,450,502 | 9/1995 | Eschbach et al. | 382/169 |
| 5,485,568 | 1/1996 | Venable et al. | 395/155 |
| 5,608,544 | 3/1997 | Yamanishi | 358/453 |
| 5,640,468 | 6/1997 | Hsu | 382/190 |
| 5,666,503 | 9/1997 | Campanelli et al. | 345/356 |

*Primary Examiner*—Yon J. Couso
*Attorney, Agent, or Firm*—Oliff & Berridge, PLC

[57] ABSTRACT

The present invention describes a method for automatic cropping of images containing regions where intensity levels are uniform and other regions where intensity levels vary considerably. An image to be automatically cropped is scaled down to a grid and divided into non-overlapping blocks. The mean and variance of intensity levels are calculated for each block. Based on the distribution of variances in the blocks, a threshold is selected for the variance. All blocks with a variance higher than this threshold variance are selected as regions of interest. The regions of interest are then cropped to a bounding rectangle.

21 Claims, 8 Drawing Sheets

AUTOMATIC IMAGE CROPPING

BACKGROUND OF THE INVENTION

This invention is related to a method for the automatic cropping of images, and is particularly suitable to images that are texture-free, or relatively texture-free.

A typical image contains some regions where intensity level, and color, are uniform, and other regions where intensity level and color vary considerably. For instance, the "background" of an image may be uniform with a distinct "edge" separating the background from the "foreground." For example, a portrait typically comprises a subject set against a uniform backdrop or background, such that a sharp edge or boundary exists between the subject and the background.

Frequently, it is desirable to select only a particular region of an image, and to reproduce the selected region, thereby eliminating unwanted or excess background to give the image a more desirable composition. This selection process is referred to as cropping. Often, images are cropped to the foreground and most of the background is discarded.

Cropping is usually done by hand or requires operator interaction in order to properly select the subject and cropping dimensions. For example, U.S. Pat. No. 4,809,064 to Amos et al. discloses an apparatus for printing a selected portion of a photographic negative onto a photosensitive paper to form an enlarged and cropped photographic print. However, the apparatus requires human operation to determine the crop. Similarly, U.S. Pat. No. 5,115,271 to Hagopian discloses a variable photographic cropping device for maintaining multiple constant proportions of a visible area that includes a pair of masks situated in a housing having a central window. The apparatus also requires an operator.

In the field of automatic image enhancement, methods are known for improving the contrast in a natural scene image or altering the sharpness in a reproduction of an electronically encoded natural scene images. Such methods have been disclosed, for example, in U.S. Pat. Nos. 5,450,502 and 5,363,209 to Eschbach et al., the disclosures of which are incorporated herein by reference. However, such automatic image enhancement methods do not disclose automatic image cropping.

For high quality publication and printing, manual cropping may be preferred for artistic reasons. For large volume printing, including, but not limited to, passport photographs, yearbooks, catalogs, event books, portraits, other images with uniform backgrounds, and the like, it is desirable to have the option to use autocropping to enhance productivity and uniformity of the cropping process.

SUMMARY OF INVENTION

The present invention relates to a method for the automatic cropping of images. Further, the present invention relates to a method for automatically cropping images that are texture-free, or relatively texture-free, to their regions of interest.

According to the present invention, an image to be automatically cropped is scaled down to a grid and divided into non-overlapping blocks. The mean and variance of intensity levels are calculated for each block. Based on the distribution of variances in the blocks, a threshold is selected for the variance. All blocks with a variance higher than the threshold variance are selected as regions of interest. The regions of interest are cropped to a bounding rectangle to provide an autocropped image with a tight fit. The autocropped image may then be subjected to a post-processing image operation including, but not limited to, scaling the autocropped image to a larger or smaller dimension, image enhancement, annotating, transmitting, halftoning, and the like.

The present invention may optionally include an edge strength distribution analysis of an image. A threshold is chosen from a sorted list of edge strengths in order to select any block that contains a significant number of edge pixels and was not selected after the intensity variance analysis.

BRIEF DESCRIPTION OF DRAWINGS

The file of this patent contains at least one drawing executed in color. Copies of this patent with color drawing(s) will be provided by the Patent and Trademark Office upon request and payment of the necessary fee.

DETAILED DESCRIPTION OF PREFERRED EMBODIMENTS

Figure 5:
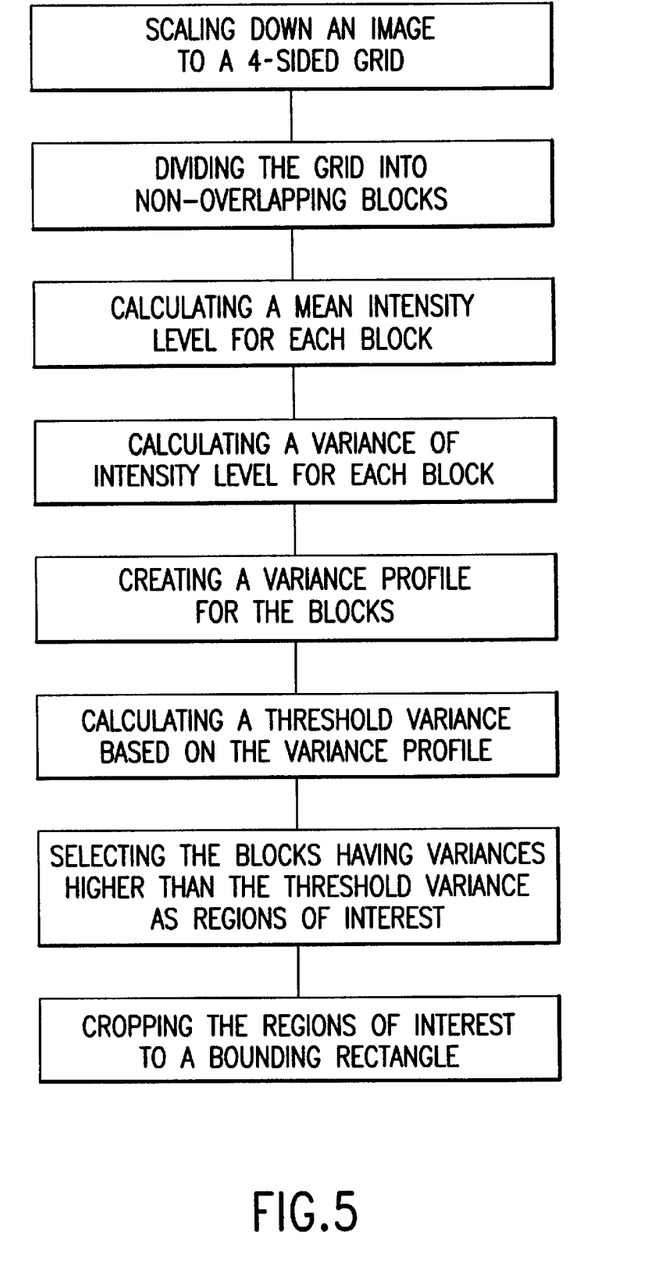
FIG. 5 is a flowchart depicting the steps of practicing the invention.

The present invention relates to a method of automatic image cropping of images and the steps of practicing the invention are depicted in FIG. 5. Preferably, the present invention in embodiments relates to automatic image cropping of images that are texture-free or relatively texture-free.

Figure 6:
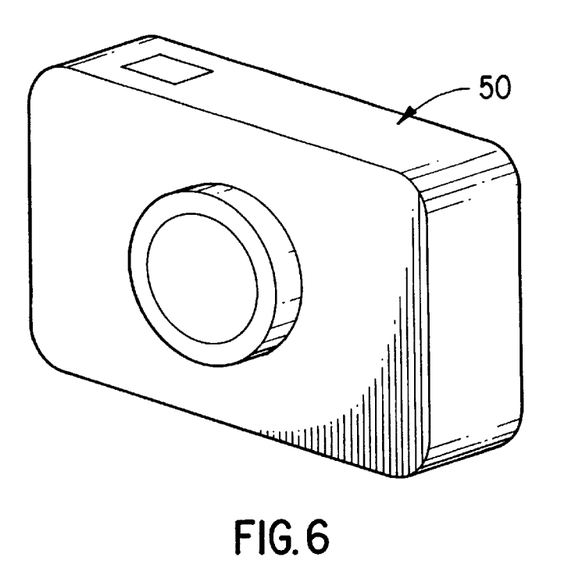
FIG. 6 is a front perspective view of an exemplary camera that practices the steps of the invention.
Figure 7:
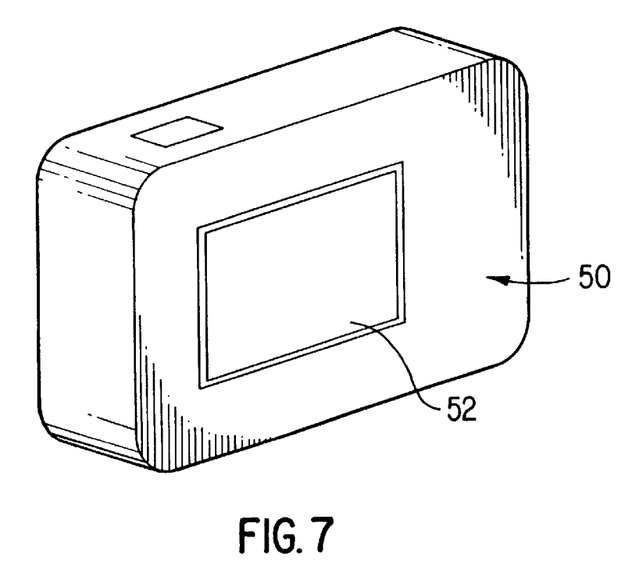
FIG. 7 is a rear perspective view of the exemplary camera shown in FIG. 6.

The automatic image cropping method of the present invention is independent of the image input or acquisition method. Any image acquisition device that converts a picture into electronic or digital data, such as a computer data file, is acceptable for using the method of the present invention. Acquisition devices for images to be automatically cropped include, but are not limited to, a digital scan-to-print system, a digital camera 50 as shown in FIGS. 6 and 7, a digital scanner, a photo CD, or laser disc, or the like.

The images themselves are defined in terms of pixels, wherein each pixel is an electrical or electronic signal with a digital gray value that varies between a white level and a black level. In a currently desirable system, in which calculations may be done on 8 bits of information or more, 256 levels of gray will be available for use. Pixels are also identified in terms of position. A pixel may define a unique location (m,n) within an image, identified by its $m^{th}$ pixel position in a line (or column), and its $n^{th}$ line position in a page (or row). Color is therefore represented by those gray values for red, blue and green. For example, in the RGB color space, a single color pixel is represented by three values, one for red, one for blue, and one for green. The color of the particular pixel can be defined as a combination of the red, blue and green color levels.

The automatic image cropping method of the present invention is also independent of the output method. The output methods for an image autocropped according to the present invention include, but are not limited to, a laser printer, ink jet ink printer, LCD display 52 on the digital camera 50 shown in FIG. 7, CRT display, magnetic tape or other media, dye sublimation printer, a photographic printer, or the like. These output devices may have many characteristics. However, they have as a common requirement the representation of gray or color pictorial images.

According to an embodiment of the present invention, images are initially defined in terms of the red, green, blue ("RGB") color space. Preferably, images defined in the RGB color space are directed to a color space converter and converted to a luminance color space. In embodiments, however, it is possible that the image will already be in luminance color space, as it is common to convert RGB values to luminance/chrominance space for other image processing. Whatever space is used, it must have a component that relates to the human visual perception of lightness or darkness.

In embodiments, the initial image data in RGB color space may be converted to a luminance color space using the luminance channel Y in Xerox YES color space of the "Xerox Color Encoding Standard," XNSS 289005, 1989. The RGB color space may also be converted to a luminance color space using the luminance channel Y in the known television encoding standard, YIQ. In an embodiment of the present invention, the luminance channel Y is calculated according to the following general formula:

Y=0.252939×(Red Channel)+0.684458×(Green Channel)+ 0.062603×(Blue Channel).

All statistical analysis and color conversion is preferably carried out on a scaled down version of the input image. This speeds up the automatic image cropping process and also provides a certain degree of robustness against noise.

According to embodiments of the present invention, an image to be autocropped is scaled down to a regular grid. The grid is then divided into non-overlapping square blocks, N×N, of a smaller size, including, but not limited to, 4×4, 8×8, 16×16, 64×64 pixels, or the like. The height and width of each block is indicated by N pixels. In an embodiment of the invention, the grid size is 256×256 pixels, and the block size is 4×4 pixels. However, different grid and block sizes can be used so long as the objectives of the present invention are achieved.

According to the present invention, the cue for selecting regions of interest in an image is the luminance profile of the intensity levels in the blocks. Alternatively, the RGB profile of the intensity levels in the blocks can be used. The mean and variance of the intensity level are calculated for each block consisting of N×N pixels.

The mean intensity level, $\mu$, in each block is calculated according to the following formula (1):

$$\mu = \frac{1}{N^2}\sum_{i=1}^{N^2} g_i \qquad (1)$$

wherein $g_i$ is the intensity level of the $i^{th}$ pixel in the block, and N is the size of each block in pixels. The variance, $\sigma$, in each block is calculated according to the following formula (2):

$$\sigma = \frac{1}{N^2-1}\sum_{i=1}^{N^2}(g_i-\mu)^2 \qquad (2)$$

Figure 1:
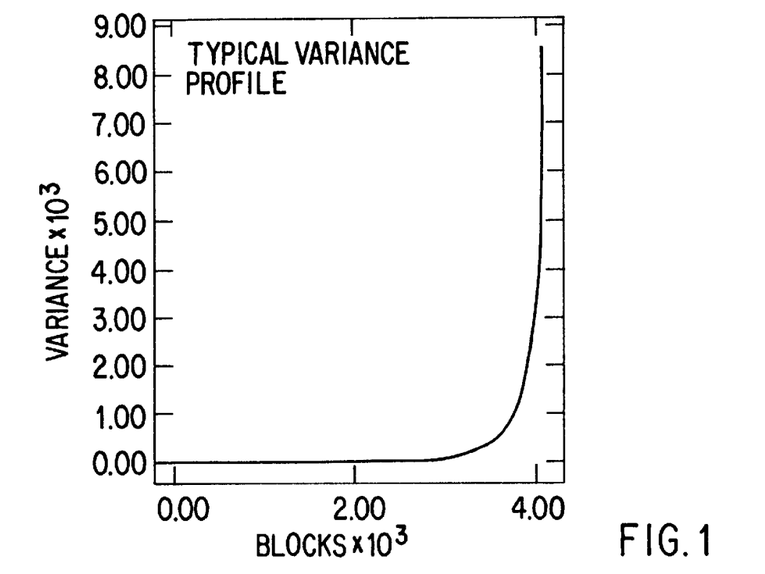
FIG. 1 shows a typical intensity variance profile of an image.

FIG. 1 shows the typical intensity variance profile of an image. From FIG. 1, it is apparent that most blocks in an image exhibit very low variances.

Based on statistical analysis and the distribution of the variances in the blocks, a threshold variance is selected. From FIG. 1, a generally optimal threshold variance is picked at the "knee" of the variance profile curve. According to the present invention, the threshold variance is preferably picked as a point on the curve furthest from a line joining the minimum and the maximum variance. All blocks with a variance higher than this threshold variance are selected as regions of interest (i.e., elements of the foreground) to remain in the autocropped image. All blocks with a variance less than the threshold are considered to be uninteresting (i.e., elements of the background) and are removed from the autocropped image. The threshold variance may also be adjusted higher or lower to include or exclude more blocks. For example, the threshold variance value may be reduced by an empirically determined selectivity factor to include more objects of interest. In an embodiment of the present invention, the threshold variance is reduced by about forty percent to include more blocks as regions of interest.

The blocks selected as regions of interest are then cropped to a bounding rectangle by finding the first selected block along the four sides of the grid, thereby giving a tight fit. All blocks within the bounding rectangle are included in the autocropped image. The tightness of the crop is application dependent and is fully adjustable.

The cropped image may be scaled to a larger (or smaller) dimension and a border selected for the scaled autocropped image. In an embodiment of the present invention, the automatic cropping of an image is set to a default border of about 0.01 (i.e., a 1% border) of the larger dimension.

An optional cleanup post-processing pass may be carried out to mark unselected blocks that are inside selected regions (i.e., typically the "interior" of an object) for further post-processing image operations. An embodiment of the present invention uses a seed fill algorithm to accomplish this purpose. Various seed fill algorithms are known in the art including, but not limited to, that recited in Paul S. Heckbert, *A Seed Fill Algorithm*, Graphics Gems, 1990, incorporated herein by reference. Selected regions smaller than the specified parameter for the smallest foreground image effect that is to be retained as interesting are eliminated. In an embodiment of the present invention, small details corresponding to "noise" in the background are examined, in blocks and pixels. These details are removed from the autocropped image. As a result, small glitches and spots are eliminated, thereby providing a better bounding rectangle, especially at the edges of the autocropped image.

After the intensity variance analysis, the image optionally may be further analyzed using edge strength information as an additional cue. Some images display low contrast edges at the boundaries of the foreground and the background. Although the results of the intensity variance analysis described herein are satisfactory, results for some images may be improved if an edge strength distribution is analyzed.

Figure 2:
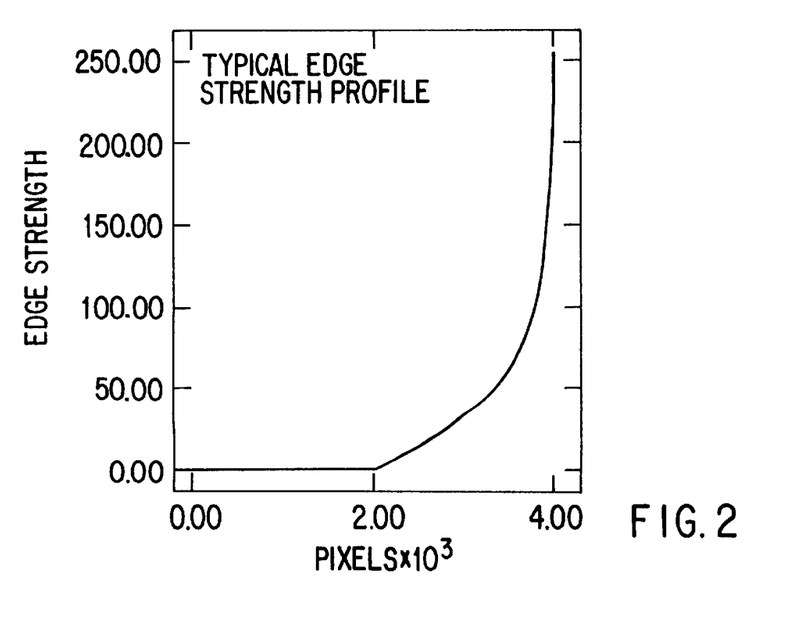
FIG. 2 shows a typical edge strength profile of an image.
Figure 3A:
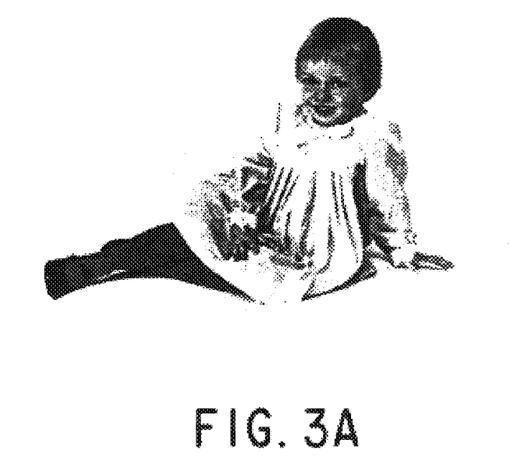
FIG. 3(a) shows a picture to be autocropped using the method of the present invention.
Figure 3B:
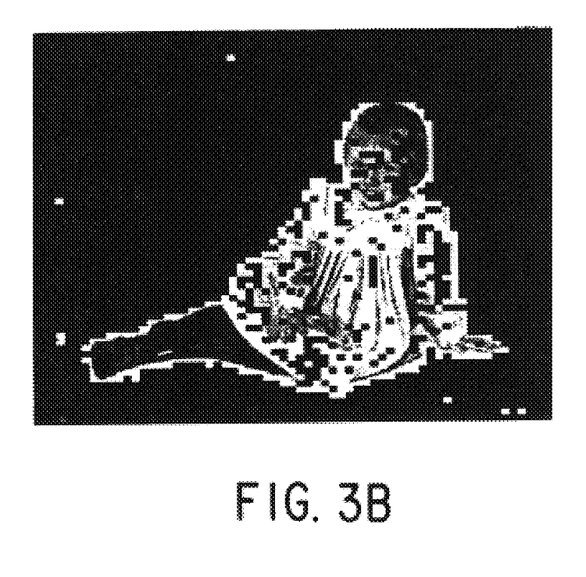
FIG. 3(b) shows the image after blocks with a luminance variance higher than a threshold variance are selected.
Figure 3C:
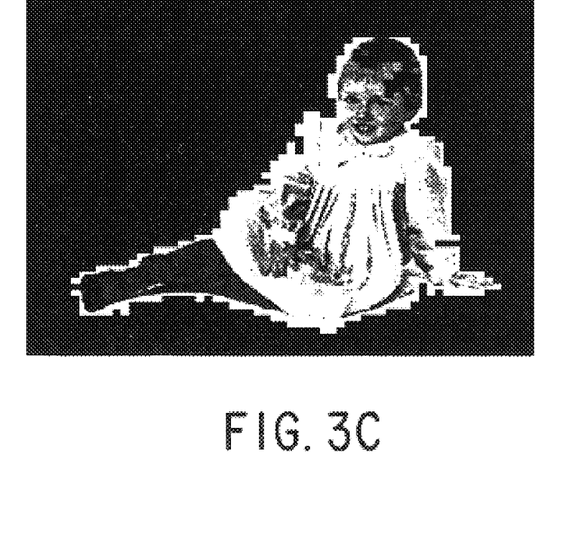
FIG. 3(c) shows the image after a post-processing cleanup pass is conducted.
Figure 3D:
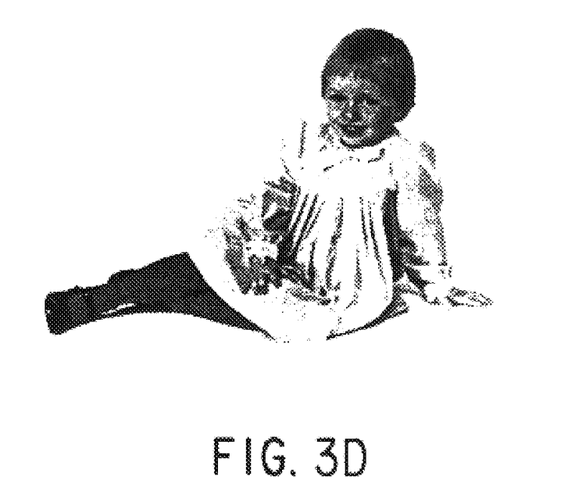
FIG. 3(d) shows the autocropped image with a border scaled to the same horizontal dimension as the original picture.
Figure 4A:
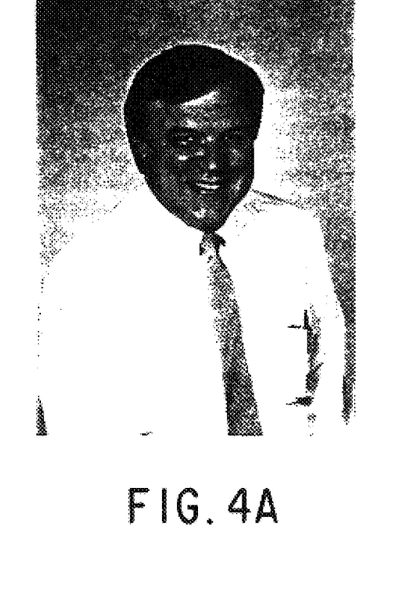
FIG. 4(a) shows a second picture to be autocropped using the method of the present invention.
Figure 4B:
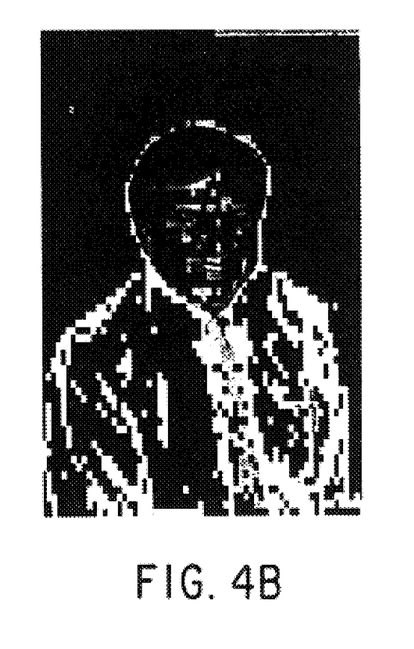
FIG. 4(b) shows the image after blocks with a luminance variance higher than a threshold variance are selected.
Figure 4C:
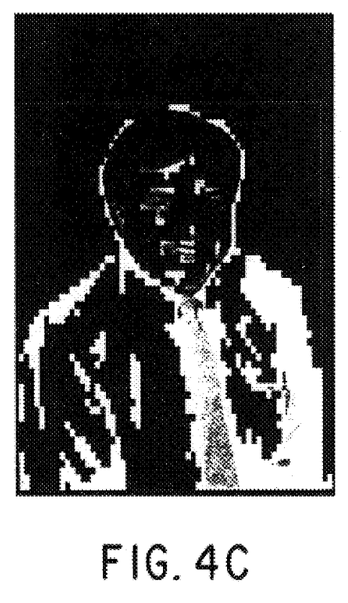
FIG. 4(c) shows the image after a post-processing cleanup pass is conducted.
Figure 4D:
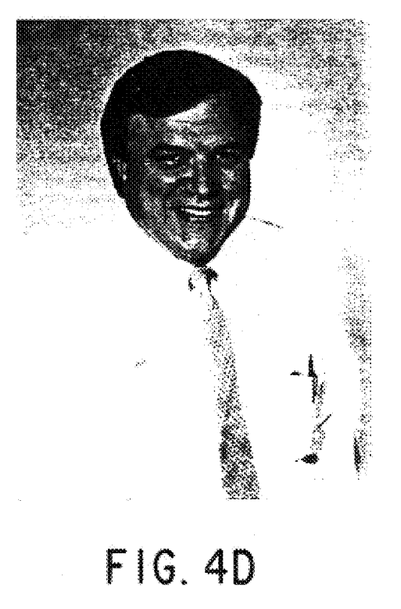
FIG. 4(d) shows the autocropped image with a border scaled to the same vertical dimension as the original picture.

Similar to the variance analysis, the edge strength distribution of the blocks is analyzed for a suitable threshold. A typical edge strength plot for an image is shown in FIG. 2. In embodiments, the edge strength computation may be carried out using a digital Laplacian operator, such as that recited in Rafael C. Gonzalez & Richard E. Woods, *Digital Image Processing*, 100, 420, 453 (1992), the disclosure of which is herein incorporated by reference. Using the Laplacian operator, a threshold is chosen from the edge strength distribution. Any blocks with significant edge information (i.e., a specified number of pixels greater than the threshold) and that are not selected as regions of interest from the variance analysis are marked as "interesting."

According to the present invention, automatic image cropping relies on several empirically determined parameters for its performance. The following parameters described below include, but are not limited to, those parameters that can be tuned to customize automatic image cropping to a particular image set being analyzed. One skilled in the art may alter any or all of these parameters based on the a priori information available about the images to be autocropped.

Grid Size is the size of the square grid on which the scaled down version of the input image is sampled. Increasing the size of this grid makes the program more sensitive to noise. Image effects that would be too small to be significant on a grid of size 256×256, for instance, may be significant on larger grids. The time of computation also increases with the increased grid size. For example, with a 512×512 sampling grid, the time is approximately four times that with a 256×256 grid if all other parameters are unchanged.

Block Size is the size of the local neighborhood over which variance analysis is carried out. Block Size corresponds to the height and width of the non-overlapping blocks, and is typically measured in pixels. A large block size results in a coarse analysis of the image, while a small block size results in a finer analysis. The block size controls the size of the local neighborhood that is included with an edge between the background and the foreground. The margin around the foreground is larger with a large block size.

Black Object Size is the size of the smallest background image effect that is retained as an uninteresting effect. This size is measured in blocks. All uninteresting regions whose size is less than the selected Block Size are marked as interesting regions. Typically these are completely covered by interesting regions implying that they are the interior of foreground effects.

White Object Size is the size of the smallest foreground image effect that is retained as an interesting effect. The default sizes for foreground and background effects are generally not identical, but can be independently selected. Increasing the value of this parameter has the effect of eliminating larger and larger connected regions of interest, and decreasing it has the opposite effect.

Additional parameters for an edge strength distribution analysis include, but are not limited to:

Filter Coefficients contains the filter coefficients to be used in the optional edge detection part of the automatic image cropping. Filter coefficients are weights used in a sliding window (including, but not limited to, an odd number of rows and columns) used to compute the weighted average of the gray-scale values in the neighborhood of each pixel in an image. This operation can be accomplished through any edge detection filter and is not constrained to be Laplacian-like. This operation is called digital convolution and is known in the art of signal and image processing, for example in Rafael C. Gonzalez & Richard E. Woods, *Digital Image Processing*, (1992) and in J. Canny, *IEEE Transactions in Pattern Analysis and Machine Intelligence*, Vol. 8, pp. 697–98 (1986), incorporated herein by reference.

Edge Pixels is the number of pixels within a block that must have an edge strength greater than the threshold for the block to be selected as an interesting region. This parameter must not be disproportionately large when compared to the block size. Too small a value for this parameter makes it overly sensitive to noise. Conversely, the edge analysis phase doesn't add anything useful if the parameter has too high a value.

EXAMPLES

Two images autocropped according to the method of present invention, i.e., automatic image cropping, appear in FIGS. 3 and 4.

The parameters used for autocropping these images based on luminance intensity data are a Grid Size of 256×256 pixels; a Block Size of 4×4 pixels; a Black Object Size of 15 blocks; and a White Object Size of 4 blocks.

Example I:

FIG. 3 shows an image that has been subject to the automatic image cropping method of the present invention. FIG. 3(*a*) shows the original picture to be autocropped. FIG. 3(*b*) shows the picture after it is subsampled into a grid (256×256 pixels), divided into non-overlapping blocks (64× 64 blocks of 4×4 pixels per block), and scaled to match the original. All blocks with a luminance variance higher than a threshold variance are selected as regions of interest. FIG. 3(*c*) shows the autocropped image in which a post-processing pass is made to toggle groups of blocks in large areas of the opposite type of blocks and to eliminate noise in the background. Also shown is a bounding box (i.e., red rectangle) that is calculated to give a tight fit to the autocropped image. FIG. 3(*d*) shows the autocropped image, the image within the bounding box of FIG. 3(*c*), scaled to the same horizontal dimension as the original and with a 5% border.

Example II:

FIG. 4 shows a second image that has been subject to the automatic image cropping method of the present invention. FIG. 4(*a*) shows the original picture to be autocropped. FIG. 4(*b*) shows the picture after it is subsampled into a grid (256×256 pixels), divided into non-overlapping blocks (64× 64 of 4×4 pixels per block), and scaled to match the original. All blocks with a luminance variance higher than a threshold variance are selected as regions of interest. FIG. 4(*c*) shows the autocropped image in which a post-processing pass is made to toggle groups of blocks in large areas of the opposite type of blocks and to eliminate noise in the background. Also shown is a bounding box (i.e., red rectangle) that is calculated to give an autocropped image with a tight fit. FIG. 4(*d*) shows the autocropped image, the image within the bonding box of FIG. 4(*c*), scaled to the same vertical dimension as the original with the side and bottom borders corresponding to the original picture and with a 5% border on the top.

Thus, automatic image cropping according to the present invention handles most texture-free, or relatively texture-free, images in a predictable and productive fashion.

It will no doubt be appreciated that the present invention can be accomplished through application software accomplishing the functions described, to operate a digital computer or microprocessor, through a hardware circuit.

Figure 8:
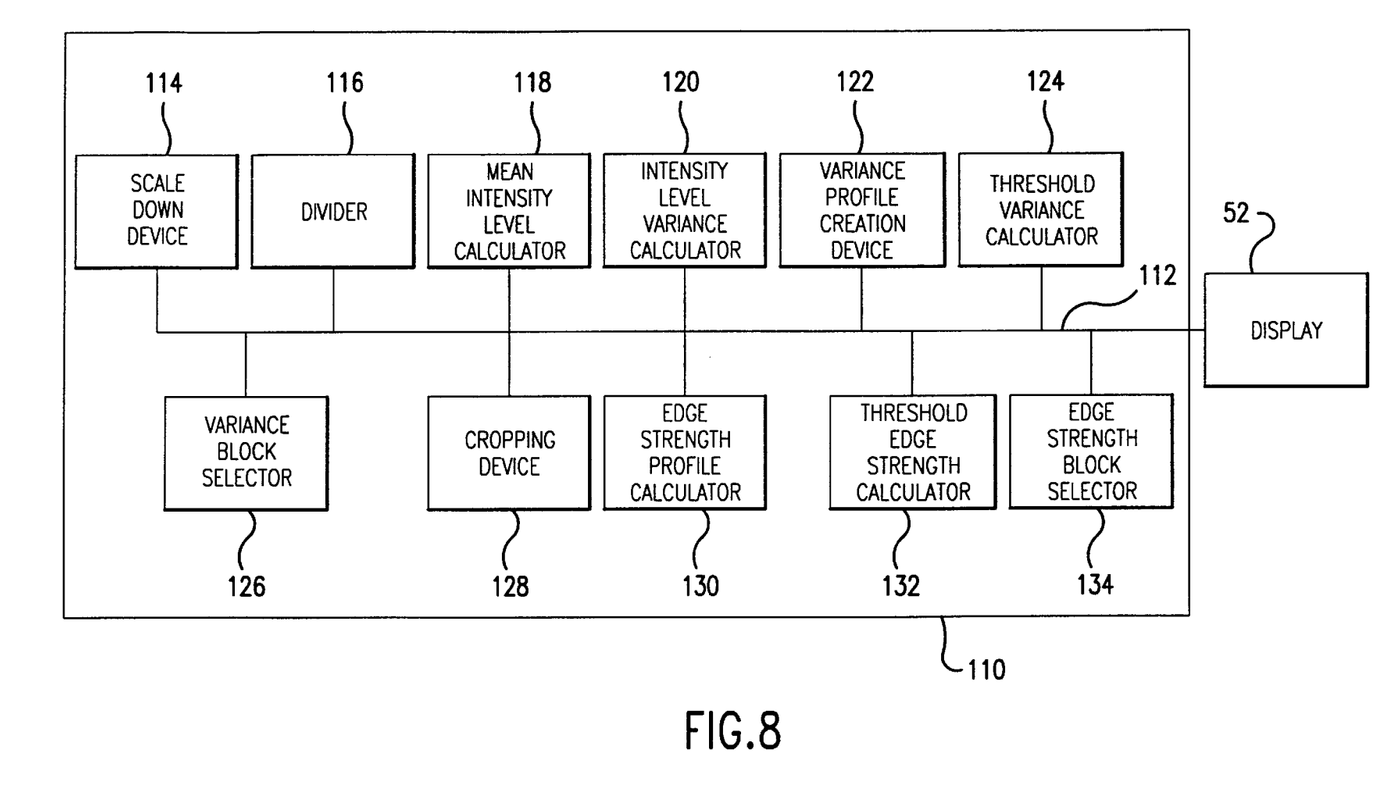
FIG. 8 is a schematic diagram of an apparatus of the invention for automatically cropping an image.

An apparatus 110 of the invention automatically crops an image is shown in FIG. 8. The apparatus 110 is connected to the display 52 by a bus 112. The apparatus includes a scale down device 114, a divider 116, a mean intensity level calculator 118, an intensity level variance calculator 120, a variance profile creation device 122, a threshold variance calculator 124, a variance block selector 126, a cropping device 128, an edge strength profile calculator 130, a threshold edge strength calculator 132 and an edge strength block selector 134. These components are interconnected by the bus 112.

The scale down device 114 scales down the image to a grid having four sides. The divider 116 divides the grid into a plurality of non-overlapping blocks. The mean intensity level calculator 118 calculates a mean intensity level for each of the blocks. The intensity level variance calculator 120 calculates a variance of an intensity level for each of the blocks. The variance profile creation device 122 creates a variance profile for the blocks. The threshold variance calculator 124 calculates a threshold variance based on the variance profile.

The variance block selector 126 selects the blocks having the variance higher than the threshold variance as regions of interest. The cropping device 128 crops the regions of interest to a bounding rectangle. The edge strength profile calculator 130 calculates a profile of edge strengths for the blocks. The threshold edge strength calculator 132 calculates a threshold edge strength from the profile. The edge strength block selector 134 selects the blocks that have an edge strength higher than the threshold edge strength and not selected as regions of interest.

The invention has been described with references to particular embodiments. Modifications and alterations will be apparent to those skilled in the art upon reading and understanding this specification. It is intended that all such modifications and alterations are included insofar as they come within the scope of the appended claims.

What is claimed is:

1. A method for automatically cropping an image, comprising:
   scaling down said image to a grid having four sides;
   dividing said grid into a plurality of non-overlapping blocks;
   calculating a mean intensity level for each of said blocks;
   calculating a variance of an intensity level for each of said blocks;
   creating a variance profile for said blocks;
   calculating a threshold variance based on said variance profile;
   selecting said blocks having said variance higher than said threshold variance as regions of interest;
   cropping said regions of interest to a bounding rectangle;
   calculating a profile of edge strengths for said blocks;
   calculating a threshold edge strength from said profile; and
   selecting said blocks having an edge strength higher than said threshold edge strength and not selected as regions of interest.

2. The automatic image cropping method of claim 1, wherein said intensity level is a luminance intensity.

3. The automatic image cropping method of claim 1, wherein said intensity level is a red, green, blue intensity.

4. The automatic image cropping method of claim 1, wherein said mean is calculated by the formula $$\mu = \frac{1}{N^2} \sum_{i=1}^{N^2} g_i$$

wherein $g_i$ is the intensity level of the $i^{th}$ pixel in the block, and N is a height and a width of each block in pixels.

5. The automatic image cropping method of claim 4, wherein said variance is calculated by the formula $$\sigma = \frac{1}{N^2 - 1} \sum_{i=1}^{N^2} (g_i - \mu)^2.$$

6. The automatic image cropping method of claim 1, wherein said threshold voltage variance is selected as a point on a curved portion of a variance profile.

7. The automatic image cropping method of claim 6, wherein said threshold variance is adjusted by a selectivity factor.

8. The automatic image cropping method of claim 7, wherein said threshold variance is reduced to select more regions of interest.

9. The automatic image cropping method of claim 7, wherein said selectivity factor is about forty percent.

10. The automatic image cropping method of claim 1, wherein said grid is 256 by 256 pixels.

11. The automatic image cropping method of claim 1, wherein said non-overlapping blocks are 4 by 4 pixels.

12. The automatic image cropping method of claim 1, wherein said bounding rectangle is defined by a first selected block along each of the four sides of the grid.

13. The automatic image cropping method of claim 1, further comprising subjecting an autocropped image to a post-processing image operation.

14. The automatic image cropping method of claim 1, further comprising scaling said bounding rectangle to a larger or smaller dimension having a border.

15. The automatic image cropping method of claim 14, wherein said border is a default border of about 1% of said dimension.

16. The automatic image cropping method of claim 1, further comprising marking unselected blocks inside selected regions for further post-processing image operations.

17. The automatic image cropping method of claim 1, further comprising removing details corresponding to noise in the background of the cropped image to provide a better bounding rectangle.

18. An apparatus for automatically cropping an image, comprising:
   means for scaling down said image to a grid having four sides;
   means for dividing said grid into a plurality of non-overlapping blocks;
   means for calculating a mean intensity level for each said blocks;

means for calculating a variance of an intensity level for each of said blocks;

means for creating a variance profile for said blocks;

means for calculating a threshold variance based on said variance profile;

means for selecting said blocks having said variance higher than said threshold variance as regions of interest;

means for cropping said regions of interest to a bounding rectangle;

means for calculating a profile of edge strengths for said blocks;

means for calculating a threshold edge strength from said profile; and means for selecting said blocks having an edge strength higher than said threshold edge strength and not selected as regions of interest.

19. The apparatus of claim 18, further comprising an input means for acquiring said image and an output means for storing said autocropped image.

20. The apparatus of claim 19, wherein said input means is selected from the group consisting of a digital scanner and a digital camera.

21. The apparatus of claim 20, wherein said output means is selected from the group consisting of a printer, a LCD display, a CRT display, a magnetic media, and a photographic printer.

* * * * *